Dec. 25, 1945.  W. E. LLEWELLYN  2,391,719
APPARATUS FOR CUTTING FILAMENTS
Filed July 27, 1944
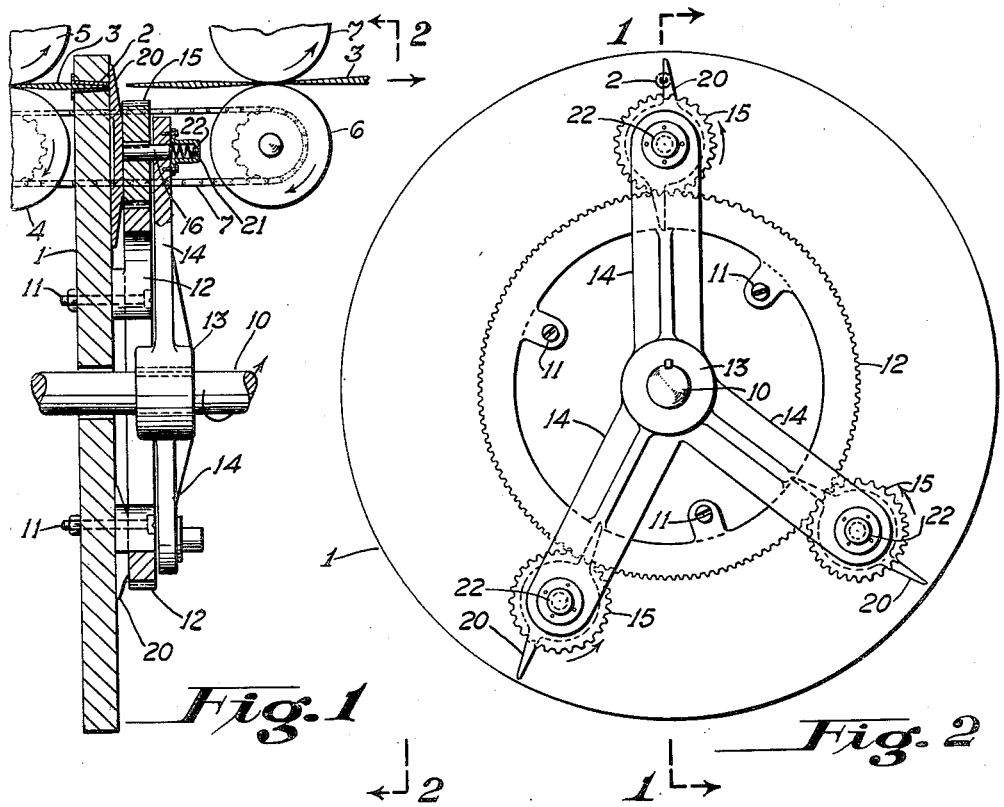
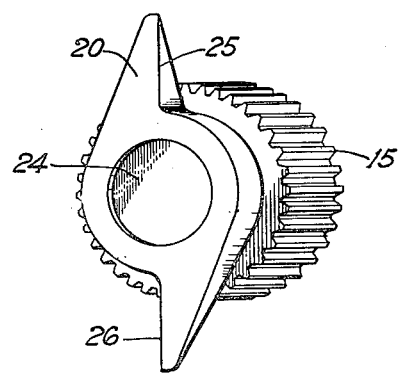
Walter E. Llewellyn INVENTOR.
BY
*J. M. ____*
ATTORNEY Patented Dec. 25, 1945

2,391,719

UNITED STATES PATENT OFFICE 2,391,719

APPARATUS FOR CUTTING FILAMENTS

Walter E. Llewellyn, Nutley, N. J., assignor to E. I. du Pont de Nemours & Company, Wilmington, Del., a corporation of Delaware Application July 27, 1944, Serial No. 546,871

8 Claims. (Cl. 164—61)

This invention relates to an apparatus for cutting filaments and, more particularly, to an apparatus comprising a rotary cutting assembly and adapted for cutting tapered filament.

Tapered filaments of synthetic linear polymers are of value in the manufacture of paint brushes and the like to replace natural bristles, and in the manufacture of fishing lines and leaders, in which they replace braided textile fibers, silk worm gut, and the like. It has proved economical and practical to form a continuous tapered filament composed of a series of tapered sections, and to cut this filament up into individual pieces for use. In Crane and Fields U. S. Patent 2,343,887, entitled "Apparatus for cutting tapered filaments," is disclosed and claimed an apparatus which is adapted to cut continuous tapered filament into individual pieces, the apparatus being specifically designed to correlate the rate of travel of the filament and the speed of rotation of a cutting element so that the filament will be severed to give bristles all substantially identical in length and taper.

While the rotary cutting assembly disclosed in U. S. Patent 2,343,887 will function for the purpose, experience has shown that it does not always cut the filament as cleanly as might be desired, the cutting knife requires frequent replacement because of dullness, and likewise the boss 21 (see Fig. 5 of the patent) has to be replaced frequently due to wear. Further, proper adjustment of the cutting knife or knives to close contact with the cutter face (boss 21) is extremely difficult and, even when properly adjusted initially, the knives soon go out of adjustment and poor cuts result.

An object of the present invention is to provide an improved rotary cutting assembly for cutting filaments. A further object is to provide such an assembly wherein the cutting knives have extremely high velocity at the point of cut, the adjustment of the knives to close contact with the cutter face is automatic, and the cutting knives are continuously self-sharpening. A still further object is to provide such an assembly in which replacement of the cutting knives or cutter face is only necessary at infrequent intervals. A more specific object is to provide an improved rotary cutting assembly adapted for severing a continuous tapered filament in the apparatus disclosed in U. S. Patent 2,343,887. Other objects will be apparent from the description of the invention given hereinafter.

The above objects are accomplished according to the present invention by delivering a continuous filament to a cutting mechanism that comprises a plate provided with an opening through which the filament is delivered, and an epicyclic gear train driven through a shaft which may be correlated with the rate of delivery of filament as in U. S. Patent 2,343,887, cutting knives being carried by the planets of the gear train and positioned so as to ride yieldingly against the plate.

While the apparatus of the present invention is adapted broadly for cutting continuous filament, it is particularly adapted to replace the rotary cutting knife mechanism shown in some detail in Fig. 5 of U. S. Patent 2,343,887.

The invention will be described in detail with reference to the accompanying drawing wherein:

Fig. 1 is a section on the line 1—1 of Fig. 2, through a rotary cutting assembly according to a preferred embodiment of the present invention;

Fig. 2 is an elevation of the same rotary cutting assembly, looking in the direction of the arrows 2—2 in Fig. 1; and Fig. 3 is a perspective view, on a larger scale, of one of the planet gears and associated cutting knives shown in Figs. 1 and 2.

The assembly illustrated comprises a circular plate 1 provided with an opening in which the replaceable bushing 2 is disposed. The filament 3 to be cut is delivered to the bushing 2 by the pair of pinch rolls 4 and 5 and the pieces of filament are taken away by the pair of pinch rolls 6 and 7 on the opposite side of plate 1. One of each pair of pinch rolls is driven, usually synchronously with the driven roll of the other pair, by a chain drive 7 or the like. The construction so far described does not differ fundamentally from that shown in U. S. Patent 2,343,887 except that the bushing 2 fits flush with the surface of plate 1 on the opposite side from the pinch rolls 4 and 5 and thus, in effect, provides a unitary cutter face.

Passing through a larger opening in the plate 1 is the drive shaft 10. This shaft 10 may be turned by any conventional means, not shown, but preferably is driven at a speed correlated with the rate of delivery of the filament 3 to the bushing 2 in the manner shown in U. S. Patent 2,343,887. Bolted to the plate 1 by the bolts 11 and positioned parallel thereto is the sun gear 12 which is mounted concentrically with respect to the longitudinal axis of shaft 10. The spider 13 is keyed to the shaft 10 to turn in fixed relation therewith and may have a plurality of legs 14, three being shown in Fig. 2. Each leg 14 has a planet gear 15 rotatably mounted therein adjacent its outer end by means of the planet gear shaft 16 (see Fig. 1), the planet gears 15 meshing with stationary sun gear 12. The axis of each planet gear shaft 16 is perpendicular to the face of the plate 1.

Each planet gear 15 carries a cutting knife 20 adapted to ride against the face of the plate 1 which may be plane and smooth. The cutting knife 20 of each planet gear 15 is held yieldingly against the plate 1 by means of a coiled spring 21 restrained in a housing 22 and acting on the planet gear shaft 16 to force it in the direction of the plate 1. In Fig. 3 there is illustrated on a larger scale one of the planet gears 15 and its associated knife 20.

The operation of the rotary cutting assembly described above is as follows: the spider 13 and associated legs 14 turn as the drive shaft 10 turns and the planet gears 15 accordingly travel around the sun gear 12. Due to the meshing of the planet gears 15 with the sun gear 12, they revolve at a relatively far greater rate than drive shaft 10 and, hence, the cutting knives 20 travel at high speed. In the course of one revolution of the drive shaft 10, each knife 20 passes over the bushing 2 and in so doing cuts the filament 3. Obviously, the length of the pieces cut from the filament 13 are also subject to regulation by variation of the speed of delivery of the filament to the bushing 2 and variation of the speed at which the drive shaft 10 turns.

Although it is not a part of the present invention, the delivery of the filament 3 and the speed of rotation of the drive shaft 10 may advantageously be correlated by means of a mechanism such as shown in U. S. Patent 2,343,887. The cutting assembly may, of course, be employed in cutting either tapered or untapered filament.

The construction of the present invention is advantageous in that the cutting knives 20 pass over the bushing 2 at very high speed and thus insure clean cutting of the filament 3. The relative position of each cutting knife 20 with respect to the bushing 2 is such that the outer portion of the knife passes over the bushing 2, as shown more clearly in Fig. 1.

By providing an arrangement in which the knives 20 are held constantly under some pressure against the plate 1 as they rotate, a continuous sharpening of the knives is effected. Generally, the knives will be made of high-speed tool steel, and the self-sharpening effect may be increased by making the plate 1 of a dissimilar material such as cast iron, which may or may not be coated, lubricated or impregnated with an abrasive material. Because the bushing 2 is flush with the surface of the plate 1 on the side against which the knives 20 ride, the wear on the bushing 2 is reduced to a minimum. It will be apparent that there is no need for the operator to adjust the knives 20 since the coiled spring 21 automatically adjusts its associated knife 20. Preferably, the knives 20 are made with a recessed central section 24 to insure positive contact between the face of each knife 20 and the plate 1. To give a longer effective life to each knife 20, the knives are made with two cutting edges 25 and 26 (see Fig. 3) and the gear ratios are so arranged that the filament is cut alternatively by the cutting edges 25 and 26.

It will be understood that the embodiment of the invention shown in the drawing is merely illustrative and may be varied considerably and without departing from the scope of this invention. Since the bushing 2 is flush with the surface of the plate 1 on the knife side, it will be apparent that the plate 1 and bushing 2 provides substantially a unitary cutter face against which the knives ride and the bushing 2, as a separate unit, may be eliminated. Also, it is not necessary that the spider 13 should have three or any particular number of legs, even one or two legs being permissible. To compensate for variations in the actuating mechanism and to give greater flexibility to the apparatus, it is advantageous to have the legs of the spider adjustable angularly with respect to each other.

It is highly desirable to have the knives held yieldingly against the plate 1 and the use of coiled springs as shown in the drawing is a very practical means of accomplishing this. The specific design of the knives is not critical providing the design permits the knives to be held in close contact with the plate 1. Clearly, the speed of rotation of the knives may be changed by altering the gear ratios.

An advantage of the present invention is that it provides a relatively simple and easily constructed rotary cutting assembly which can be depended upon to cut filament cleanly over long periods of operation. A further advantage is that the cutting knives are constantly being sharpened and do not require replacement except at very infrequent intervals; also, the bushing through which the filament passes just prior to being cut is not subject to severe wear and will last for long periods. A still further advantage is that the knives in this assembly do not require adjustment initially by the operator nor will they go out of adjustment during the operation of the mechanism as their adjustment is automatic throughout.

As many apparently widely different embodiments of this invention may be made without departing from the spirit and scope thereof, it is to be understood that the invention is not limited to the specific embodiments thereof except as defined in the appended claims.

I claim:

1. In an apparatus for cutting a continuous filament and comprising a cutting means and a means for delivering said filament to said cutting means, the combination of a plate having an opening therein through which said filament is delivered, a drive shaft at right angles to said plate, a sun gear mounted in fixed position parallel to said plate and concentrically with respect to said drive shaft, a spider comprising at least one leg and being fixedly mounted on said drive shaft to rotate therewith, a planet gear rotatably mounted on said leg of said spider and meshing with said sun gear, a cutting knife carried by said planet gear and riding against said plate, the opening in said plate being in the path of said knife but removed from the path of said planet gear, and means acting on said planet gear in a direction perpendicular to said plate so as to hold said cutting knife yieldingly against said plate.

2. In an apparatus for cutting a continuous filament and comprising a cutting means and a means for delivering said filament to said cutting means, the combination of a plate having an opening therein through which said filament is delivered, a drive shaft at right angles to said plate and passing therethrough, a sun gear mounted in fixed position adjacent and parallel to said plate and concentrically with respect to said drive shaft, a spider comprising at least one leg and being fixedly mounted on said drive shaft to rotate therewith, said sun gear being positioned between said plate and said spider, a planet gear rotatably mounted on said leg of said spider and meshing with said sun gear, a cutting knife carried by said planet gear and riding against said plate, the opening in said plate being in the path of said knife but removed from the path of said planet gear, and means acting on said planet gear in a direction perpendicular to said plate so as to hold said cutting knife yieldingly against said plate.

3. In an apparatus for cutting a continuous filament and comprising a cutting means and a means for delivering said filament to said cutting means, the combination of a plate having an opening therein through which said filament is delivered, a drive shaft at right angles to said plate, a sun gear mounted in fixed position parallel to said plate and concentrically with respect to said drive shaft, a spider comprising at least one leg and being fixedly mounted on said drive shaft to rotate therewith, a planet gear rotatably mounted on said leg of said spider on the side adjacent said plate and meshing with said sun gear, a cutting knife carried by said planet gear and riding against said plate, the opening in said plate being in the path of said knife but removed from the path of said planet gear, and spring means acting on said planet gear in a direction perpendicular to said plate so as to hold said cutting knife yieldingly against said plate.

4. In an apparatus for cutting a continuous filament and comprising a cutting means and a means for delivering said filament to said cutting means, the combination of a plate having an opening therein through which said filament is delivered, a drive shaft at right angles to said plate and passing therethrough, a sun gear mounted in fixed position adjacent and parallel to said plate and concentrically with respect to said drive shaft, a spider comprising at least one leg and being fixedly mounted on said drive shaft to rotate therewith, said sun gear being positioned between said plate and said spider, a planet gear rotatably mounted on said leg of said spider on the side adjacent said plate and meshing with said sun gear, a cutting knife carried by said planet gear and riding against said plate, the opening in said plate being in the path of said knife but removed from the path of said planet gear, and spring means acting on said planet gear in a direction perpendicular to said plate so as to hold said cutting knife yieldingly against said plate.

5. In an apparatus for cutting a continuous filament and comprising a cutting means and a means for delivering said filament to said cutting means, the combination of a plate having an opening therein, a bushing fitted into said opening through which said filament is delivered, said bushing being flush with the surface of said plate to provide a continuous cutter face, a drive shaft at right angles to said plate and passing therethrough, a sun gear mounted in fixed position adjacent and parallel to said plate and concentrically with respect to said drive shaft, a spider comprising at least one leg and being fixedly mounted on said drive shaft to rotate therewith, said sun gear being positioned between said plate and said spider, a planet gear rotatably mounted on said leg of said spider on the side adjacent said plate and meshing with said sun gear, a cutting knife carried by said planet gear and riding against said plate, said bushing being in the path of said knife but removed from the path of said planet gear, and spring means acting on said planet gear in a direction perpendicular to said plate so as to hold said cutting knife yieldingly against said plate.

6. In an apparatus for cutting a continuous filament and comprising a cutting means and a means for delivering said filament to said cutting means, the combination of a plate having an opening therein, a bushing fitted into said opening through which said filament is delivered, said bushing being flush with the surface of said plate to provide a continuous cutter face, a drive shaft at right angles to said plate and passing therethrough, a sun gear mounted in fixed position adjacent and parallel to said plate and concentrically with respect to said drive shaft, a spider comprising a plurality of legs and being fixedly mounted on said drive shaft to rotate therewith, said sun gear being positioned between said plate and said spider, a planet gear rotatably mounted on each leg of said spider on the side adjacent said plate and meshing with said sun gear, a cutting knife carried by each planet gear and riding against said plate, said bushing being in the path of each knife but removed from the path of each planet gear, and spring means acting on each planet gear in a direction perpendicular to said plate so as to hold said cutting knife carried thereby yieldingly against said plate.

7. In an apparatus for cutting a continuous filament and comprising a cutting means and a means for delivering said filament to said cutting means, the combination of a plate having an opening therein through which said filament is delivered, a drive shaft at right angles to said plate and passing therethrough, a sun gear mounted in fixed position adjacent and parallel to said plate and concentrically with respect to said drive shaft, a spider comprising at least one leg and being fixedly mounted on said drive shaft to rotate therewith, said sun gear being positioned between said plate and said spider, a planet gear shaft mounted upon said leg of said spider with its axis perpendicular to said plate, a rotatable planet gear carried by said planet gear shaft at the end thereof adjacent said plate and meshing with said sun gear, a cutting knife carried by said planet gear and riding against said plate, the opening in said plate being in the path of said knife but removed from the path of the axis of said planet gear, a housing mounted on said leg of said spider, and a coiled spring mounted in said housing so as to hold said cutting knife yieldingly against said plate.

8. In an apparatus for cutting a continuous filament and comprising a cutting means and a means for delivering said filament to said cutting means, the combination of a plate having an opening therein, a bushing fitted into said opening through which said filament is delivered, said bushing being flush with the surface of said plate to provide a continuous cutter face, a drive shaft at right angles to said plate and passing therethrough, a sun gear mounted in fixed position adjacent and parallel to said plate and concentrically with respect to said drive shaft, a spider comprising at least one leg and being fixedly mounted on said drive shaft to rotate therewith, said sun gear being positioned between said plate and said spider, a planet gear shaft mounted upon said leg of said spider with its axis perpendicular to said plate, a rotatable planet gear carried by said planet gear shaft at the end thereof adjacent said plate and meshing with said sun gear, a cutting knife carried by said planet gear and riding against said plate, said bushing being in the path of said knife but removed from the path of the axis of said planet gear, a housing mounted on said leg of said spider, and a coiled spring mounted in said housing so as to hold said cutting knife yieldingly against said plate, said cutting knife and said plate being made of metals of different degrees of hardness.

WALTER E. LLEWELLYN.